UNITED STATES PATENT OFFICE.

FRITZ HARTNER, OF HOMBURG-VOR-DER-HÖHE, GERMANY.

MORTAR-FORMING MATERIAL.

1,371,762.   Specification of Letters Patent.   Patented Mar. 15, 1921.

No Drawing.   Application filed August 1, 1919. Serial No. 314,785.

*To all whom it may concern:*

Be it known that I, FRITZ HARTNER, a subject of the German Empire, and resident of Homburg-vor-der-Höhe, Germany, have invented certain new and useful Improvements in Mortar-Forming Materials; and I do hereby declare the following to be a full, clear, and exact description of the invention, such as will enable others skilled in the art to which it appertains to make and use the same.

In the gypsum deposits there occurs in great quantities anhydrite that hitherto could not be worked down for mortar making purposes. Anhydrite, that is the anhydrous modification of gypsum, without additions, does not give, even when most finely ground, a satisfactorily setting and hardening material. If fine powder of anhydrite is mixed with water, only after 30 hours a slight setting takes place, which however is essentially due to a drying process. Even the hardening being obtained by beating or stamping the water mixed anhydrite powder and molding it, is so small, that such use of anhydrite as a mortar forming material for technical building purposes is impossible.

There have already been made several experiments, it is true, to give the anhydrite by admixtures the property of hardening, but however without any practical success. I have made the surprising observation, that finely ground anhydrous gypsum is changed into a good mortar forming material by the admixture of some alkaline substances. If the mineral anhydrite is ground together with substances reacting alkaline, of which quite small quantities are sufficient, the dead product changes into a plaster that sets and hardens well in few hours.

The object of the invention is therefore to change this anhydrous gypsum into a mortar forming material by grinding it together with alkaline substances. For this purpose the alkali-oxids or hydroxids and especially the oxids or hydroxids of the alkaline earths come into consideration. First of all there must be mentioned calcium and magnesium oxid and calcium hydroxid and magnesium hydroxid.

2.5% of calcium-hydroxid for instance already caused the setting time of the powder of anhydrite to be reduced to four or at the most seven hours and the resulting mortar forming material to show already after 24 hours 7 to 8 kg/qcm. tensile strength, after 3 days 12 kg/qcm. after 7 days already more than 20 kg/qcm. and after 28 days almost 30 kg/qcm. These values refer to test pieces made by being cast into a mold. When manufactured by being pressed into a mold, even a mixture with 3 parts of sand showed after 7 days already a compressive strength of 200 kg/qcm.

The quantity of the admixture of hydrate of lime may also be increased to 5% or more. But the results of strength then do not change essentially. It is surprising that the small admixture of the substance that may be obtained so easily, produces a highly important plaster from the useless anhydrite.

Instead of caustic lime or hydrate of lime materials containing these substances may be used, as Portland cement, slag cements manufactured with lime or Portland cement, dead burnt lime and even waste building materials or waste building stones containing lime. Finally may be mentioned plastering and mortar dust, waste concrete and waste sandlime bricks, provided that they still contain free hydrate of lime. These waste materials of the building industry, which at present are waste, can be employed in a useful way.

Quite singular is however the effect of the dead burnt lime. When lime is burnt there often are formed as is known, overburnt or slagged pieces, which must be picked out from the slaked lime and thrown on the dump, if the lime plant in question did not possess effective grinding apparatus. This useless waste material from the lime-kiln is an excellent producer of the hardening capacity of the anhydrite. As it delivers caustic lime apparently only gradually, it proved to be an especially enduring admixture and it prevents degeneration upon storage.

The new mortar forming material is manufactured in a most simple way by grinding together the anhydrite with the inciting substance. It is suitable to employ the degrees of fineness that are now used in the Portland cement industry. But it is also suitable if ground anhydrite is mixed very carefully with the pulverized activating substance.

Just as with the proper gypsum it is also possible to influence the setting of this anhydrite mortar-former by certain salt admixtures.

The manufacturing of a mortar with this new mortar forming material is done after adding or not adding lean or filling materials, just as with the gypsum.

I claim:

1. A mortar forming material comprising gypsum anhydrite and an alkaline substance.

2. A mortar forming material comprising gypsum anhydrite and a hydroxid having an alkaline reaction.

3. A mortar forming material comprising gypsum anhydrite and the hydroxid of a metal of the alkaline earths.

4. A mortar forming material comprising gypsum anhydrite and a substance capable of forming a hydrate of a metal of the alkaline earths upon the addition of water.

5. A mortar forming material comprising gypsum anhydrite and materials containing a substance having setting properties and containing a hydrate forming substance of alkaline properties.

6. A mortar forming material comprising gypsum anhydrite and Portland cement.

7. A mortar forming material comprising gypsum anhydrite ground with a small percentage of a substance having setting properties and an alkaline reaction.

8. A mortar forming material comprising gypsum anhydrite ground with a material containing lime, the percentage of lime being not over five per cent.

9. A mortar forming material comprising gypsum anhydrite ground with waste building material containing lime.

10. A mortar forming material comprising gypsum anhydrite and Portlant cement to an amount sufficient to carry lime to about five per cent. of the anhydrite.

In testimony that I claim the foregoing as my invention, I have signed my name in presence of two subscribing witnesses.

FRITZ HARTNER.

Witnesses:
ANNA SCHÜSSLER,
FRANZISKA GUTMANN.

See British 21,987 of 1914